(12) United States Patent
Ito et al.

(10) Patent No.: US 6,604,374 B2
(45) Date of Patent: Aug. 12, 2003

(54) COOLING APPARATUS AND COOLING SYSTEM UTILIZING ADSORBENTS

(75) Inventors: Mutsuhiro Ito, Kasugai (JP); Tatsuya Asano, Kasugai (JP); Masanobu Hasatani, Nagoya (JP); Fujio Watanabe, Owariashi (JP)

(73) Assignee: Fuji Silysia Chemical Ltd., Kasugai (JP)

( * ) Notice: Subject to any disclaimer, the term of this patent is extended or adjusted under 35 U.S.C. 154(b) by 0 days.

(21) Appl. No.: 09/939,915

(22) Filed: Aug. 27, 2001

(65) Prior Publication Data

US 2003/0037557 A1 Feb. 27, 2003

(51) Int. Cl.[7] .................................................. F25B 27/00
(52) U.S. Cl. ............................ 62/238.3; 62/92; 62/271
(58) Field of Search ............................... 62/238.3, 271, 62/436, 480, 92, 94; 165/104.12, 62

(56) References Cited

U.S. PATENT DOCUMENTS 4,788,776 A * 12/1988 Führing et al. ................. 34/76
5,347,830 A * 9/1994 Yamada ......................... 62/481
5,359,864 A * 11/1994 Yamada ......................... 62/480
6,318,106 B1 * 11/2001 Maeda ........................... 62/271

FOREIGN PATENT DOCUMENTS

| GB | 2 119 917 | * 11/1983 | ............... 62/238.7 |
| JP | 5-115737 | 5/1993 | |

* cited by examiner

Primary Examiner—Melvin Jones
(74) Attorney, Agent, or Firm—Davis & Bujold, P.L.L.C.

(57) ABSTRACT

In a cooling apparatus, air within a room is first introduced into a radiator-type adsorber (1), where moisture contained in the air is adsorbed by A-type silica gel. The resulting low-humidity air is subsequently introduced into a desorption cooler (5), where moisture is desorbed from B-type silica gel, thereby humidifying and cooling the air. The resulting low-temperature air is then used for cooling. When a cooling capacity of the cooling apparatus is lowered, air from a heat source is introduced into the radiator-type adsorber (1), where the moisture is desorbed from the A-type silica gel, thereby recovering the adsorbability thereof. The high-humidity air resulting from the desorption of the moisture is subsequently introduced into the desorption cooler (5), where the moisture contained in the air is adsorbed by the B-type silica gel, thereby recovering the desorption cooling capacity thereof.

12 Claims, 8 Drawing Sheets

COOLING APPARATUS AND COOLING SYSTEM UTILIZING ADSORBENTS

FIELD OF THE INVENTION

The present invention relates to a cooling apparatus and a cooling system utilizing adsorbents.

BACKGROUND OF THE INVENTION

One of conventional cooling apparatuses utilizing adsorbents is disclosed in Unexamined Japanese Patent Publication No. 5-115737.

In the cooling apparatus disclosed in this publication, a high-humidity air is brought into contact with an adsorbent to be turned into a low-humidity air, and the low-humidity air is humidified by a humidifier, thereby removing heat of vaporization of water from the low-humidity air. In this manner, the temperature of the low-humidity air is lowered and the humidity thereof is made high. The resulting low-temperature air is then utilized for cooling.

In such a cooling apparatus, however, humidification is compulsorily carried out for cooling air by means of the humidifier. Because of such compulsory humidification, it sometimes happens that a moisture content in the air discharged into a room goes beyond a saturated vapor amount, which results in generation of a mist. In these cases, the humidity of air inside the room is made excessively high, and amenity is thus lost in the room.

Also, the aforementioned cooling apparatus comprises a humidifier itself, a pipe arrangement for supplying water to the humidifier, and a feed water tank for storing water for humidification. This means that the entire cooling apparatus is made complicated in structure and large in size. Additionally, it is necessary to frequently resupply water into the feed water tank and, consequently, such management of water in the feed water tank is very bothersome.

The aforementioned trouble in the resupply of water into the feed water tank could be reduced by utilizing service water, ground water, or the like, which is supplied from a water supply system fixedly provided. However, on the premise that water supplied from such an immovable water supply system is utilized as water for humidification, the cooling apparatus should be disposed in a fixed position as well, which means that the cooling apparatus would not be usable, for example, as a cooling apparatus for automobile use.

SUMMARY OF THE INVENTION

The present invention was made to solve the aforementioned problems. More particularly, one object of the invention is to provide a cooling apparatus which is capable of cooling by humidification, without the necessity of compulsory humidification by means of a humidifier, the humidification being performed within a range in which a saturated vapor amount is not exceeded. Also, the other object of the invention is to provide a cooling apparatus which is capable of cooling by humidification, without utilizing water from a feed water tank with which resupply of water is required, or from an immovable water supply system.

In order to attain the aforementioned objects, according to a first aspect of the invention, there is provided a cooling apparatus comprising:

an adsorber in which moisture contained in air in a flow path is adsorbed by a first adsorbent;

a radiator in which heat of the air in the flow path is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via the adsorber, the radiator and the desorption cooler, to an outlet of air;

outlet switching means for switching the outlet of air from/to an inside of a room to/from an outside thereof; and heating means for heating the first adsorbent in the adsorber such that the moisture is desorbed from the first adsorbent.

In this first cooling apparatus, the absorber is a device where the air flowed thereinto is brought into contact with the first adsorbent and then flowed out thereof. A specific structure of the adsorber is not particularly restricted. For example, it may be composed of a case forming the flow path of the air, the case being filled with the first adsorbent. Alternatively, it may be composed of wall surfaces forming the flow path of the air, the first adsorbent being applied onto the wall surfaces. Otherwise, it may be composed of a case or wall surfaces forming the flow path of the air, the case or the wall surfaces itself/themselves being formed out of a composition containing the first adsorbent as a main component.

The radiator is a device where the air flowed thereinto is brought into contact with the heat conductive member and then flowed out thereof. The heat conductive member needs to be capable of removing heat from the air in the flow path and then transferring the heat to the outside of the flow path. As such a heat conductive member, not by way of restriction but by way of example, fins or a plate formed out of a metal having a high heat transfer coefficient (such as copper, aluminum, or any alloy containing these) may be used. In this case, heat can be removed from the air in the flow path by means of heat exchange between the air in the flow path and an outside air. Alternatively, a pipe arrangement may be provided using the metal having a high heat transfer coefficient to be used as the heat conductive member. In this case, heat can be removed from the air in the flow path by means of heat exchange between the air in the flow path and a cooling medium, such as cooling water or the like, flowing through the pipe arrangement.

The desorption cooler is a device where the air flowed thereinto is brought into contact with the second adsorbent and then flowed out thereof. As with the specific structure of the adsorber, the desorption cooler may be composed of a case forming the flow path of the air, the case being filled with the second adsorbent. Alternatively, it may be composed of wall surfaces forming the flow path of the air, the second adsorbent being applied onto the wall surfaces. Otherwise, it may be composed of a case or wall surfaces forming the flow path of the air, the case or the wall surfaces itself/themselves being formed out of a composition containing the second adsorbent as a main component. However, it is not necessary that the specific structure of the desorption cooler should be the same as that of the adsorber.

The blast means is provided to flow the air through the flow path running from the inlet of air to the outlet thereof and may be realized, for example, by disposing a blower, such as a motor fan or the like, in the flow path. Such a blower can be disposed in any position between the inlet of air and the outlet thereof, as long as the flow of air through the flow path from the inlet of air to the outlet thereof is permitted.

The outlet switching means is realized, for example, by disposing a damper, or the like, which is capable of selectively flowing the air through one of two courses of the fluid path.

The heating means can be any means that is capable of heating the first adsorbent in the adsorber. For example, if there is available an applicable heat source, such as waste heat generated by operation of a factory, solar heat or the like, means for introducing into the adsorber the heat obtained from such a heat source may be provided. In the case of the cooling apparatus for automobile use, means for introducing into the adsorber the heat generated from an automobile engine is also possible. If there is no such heat sources available, heat generating means, such as a heating wire, may be provided to generate heat utilizing electric power. In this case, the midnight power, which is less expensive, may be utilized.

According to the cooling apparatus having the aforementioned structure, by switching the outlet of air to the inside of the room by means of the outlet switching means, and by activating the blast means without activating the heating means, the air introduced from the inlet of air is flowed through the adsorber, the radiator, and the desorption cooler, and then discharged into the room. This operational status is hereinafter referred to as a cooling mode. As to the inlet of air, if cooling efficiency is only considered, it is desirable that the air should be introduced from the inside of the room; however, if ventilation is also taken into consideration, the air may be introduced from the outside of the room. Accordingly, any means may be provided for the inlet of air such that the air can be selectively introduced from either of the inside or outside of the room, or such that it can be introduced from both sides at the same time.

During the operation in the cooling mode, in the adsorber, moisture contained in the air is adsorbed by the first adsorbent, and the humidity of the air is thus lowered. Also, a heat of adsorption is generated by the adsorption of the moisture, and this heat of adsorption rises the temperature of the air. The resulting air of a lower humidity and a higher temperature is then flowed into the radiator. Subsequently, in the radiator, the heat of the air is radiated out of the flow path, and the temperature of the air is thus lowered. The resulting air of a lower temperature is then flowed into the desorption cooler. Subsequently, in the desorption cooler, moisture adsorbed by the second adsorbent during the operation in a reproducing mode (as described below) is desorbed from the second adsorbent. With this desorption of the moisture, heat is removed from the air with the result that the temperature of the air is further lowered. The resulting air of a further lowered temperature is then discharged into the room, thereby accomplishing cooling within the room.

Now, if this cooling apparatus is continuously operated in the aforementioned cooling mode, a quantity of the moisture that can be adsorbed by the first adsorbent in the adsorber is gradually reduced, while a quantity of the moisture that can be desorbed from the second adsorbent in the desorption cooler is gradually reduced. Here, by switching the outlet of air to the outside of the room by means of the outlet switching means, and by activating the heating means as well as the blast means, the air introduced from the inlet of air is flowed through the adsorber, the radiator and the desorption cooler to be discharged out of the room. This operational status is hereinafter referred to as the reproducing mode. As to the inlet of air, the air may be introduced from either or both of the inside or/and the outside of the room. However, if it is desired that the air in the room, which has already been cooled to some degree, should be prevented from being discharged outside, the air is preferably introduced from the outside of the room.

Switching between the cooling mode and the reproducing mode may be manually operated by a user, or may be automatically operated at a reserved time, or may be automatically operated on the basis of temperature or humidity conditions in the inside or outside of the room.

During the operation in the reproducing mode, in the adsorber, the first adsorbent is heated by the heating means, and with this heating, the moisture adsorbed by the first adsorbent during the operation in the cooling mode is desorbed therefrom. As a result, the first adsorbent is reproduced and its capacity for moisture absorption is recovered again. The air that has been risen in both temperature and humidity in the adsorber is then flowed into the radiator. Subsequently, in the radiator, the heat of the air is radiated out of the flow path, and the temperature of the air is thus lowered. With this lowering in temperature, the relative humidity of the air is further risen. The resulting air of a lower temperature and a higher humidity is then flowed into the desorption cooler. Subsequently, in the desorption cooler, moisture contained in the air is adsorbed by the second adsorbent, from which moisture has been desorbed during the operation in the cooling mode. As a result, the second adsorbent is saturated with the adsorbed moisture, and its capacity for desorption cooling is thus recovered. The air flowed out of the desorption cooler is then discharged out of the room.

As mentioned above, with this first cooling apparatus, air is cooled by the desorption of the moisture from the second adsorbent in the desorption cooler and, therefore, there is no possibility that a moisture content in the air discharged into the room might exceed a saturated vapor amount, and generation of a mist can thus be prevented, unlike the case with a conventional cooling apparatus in which humidification is compulsorily preformed by means of a humidifier for cooling air. Accordingly, the humidity of the air in the room is never made excessively high, and thus, amenity is not lost inside the room, compared to the case of humidification by means of a humidifier.

Also, since it is unnecessary to provide a humidifier itself, a pipe arrangement for supply of water to the humidifier, nor the like, the entire structure of the cooling apparatus can be made compact.

Furthermore, the moisture desorbed from the second adsorbent is the moisture collected from the air by the first adsorbent during the operation in the cooling mode and transferred to the second adsorbent during the operation in the reproducing mode and, therefore, provision of a feed water tank for storage of water for humidification, or use of a water supply system for supplying service water or ground water as water for humidification is not required. As a result, it is no longer necessary to take the trouble in resupply of water into the feed water tank. In addition, since the water supply system, which is immovably provided, is not necessary to be used, a cooling apparatus not to be located in a fixed position, for example, a cooling apparatus to be installed in an automobile, can be realized as well.

In this cooling apparatus, the air is blown, by the blast means, in the same direction in both of the cooling and reproducing modes. Accordingly, the blast means can be controlled more easily, compared to the case where switching control for directions in which the air is blown is required. Also, as to the means for switching courses of the flow path of the air, provision of at least the aforementioned outlet switching means suffices. Accordingly, the outlet switching means can be controlled more easily as well, compared to the case where a complicated switching control for the courses of the flow path is necessary to be performed by means of a lot of dampers or the like.

According to a second aspect of the invention, there is provided a cooling apparatus comprising:

a radiator-type adsorber in which moisture contained in air in a flow path is adsorbed by a first adsorbent and a heat of adsorption generated by the adsorption of the moisture is radiated out of the flow path via a heat conductive member;

a radiator in which heat of the air in the flow path is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via the radiator-type adsorber, the radiator and the desorption cooler, to an outlet of air;

outlet switching means for switching the outlet of air from/to an inside of a room to/from an outside thereof; and heating means for heating the first adsorbent in the adsorber such that the moisture is desorbed from the first adsorbent.

This second cooling apparatus is provided with the radiator-type adsorber, instead of the adsorber provided in the foregoing first cooling apparatus. In the radiator-type adsorber, moisture contained in the air in the flow path is adsorbed by the first adsorbent, which is also carried out in the adsorber in the foregoing first cooling apparatus. In addition, in the radiator-type adsorber, a heat of adsorption, which is generated by the adsorption of the moisture, is radiated out of the flow path via the heat conductive member, which is not carried out in the adsorber in the foregoing first cooling apparatus. As specific forms of the heat conductive member for use in the radiator-type adsorber, those of the heat conductive member for use in the radiator can arbitrarily be used. By adopting such a radiator-type adsorber, the first adsorbent becomes more difficult to rise in temperature, compared to the case of use of the adsorber in the foregoing first cooling apparatus.

The second cooling apparatus with the radiator-type absorber is also capable of operating in the aforementioned cooling mode. More particularly, as in the first cooling apparatus, by switching the outlet of air to the inside of the room by means of the outlet switching means, and by activating the blast means without activating the heating means, air cooling can be accomplished inside the room.

As aforementioned, the first adsorbent disposed in the radiator-type adsorber is more difficult to rise in temperature and, therefore, the adsorbability per unit quantity of the first adsorbent in the radiator-type adsorber is made higher than that of the first adsorbent disposed in the absorber in the first cooling apparatus. Accordingly, with the same quantity of the first adsorbent, the second cooling apparatus with the radiator-type adsorber can be operated in the cooling mode continuously longer than the first cooling apparatus with the adsorber. Otherwise, for continuous operations in the cooling mode for the same length of time, the second cooling apparatus with the radiator-type adsorber requires a smaller amount of the first adsorbent compared to the first cooling apparatus with the adsorber. In the latter case, the radiator-type adsorber can be made compact, thereby realizing miniaturization of the cooling apparatus itself.

Also, the second cooling apparatus with the radiator-type adsorber is capable of operating in the aforementioned reproducing mode as well. More particularly, as in the first cooling apparatus, by switching the outlet of air to the outside of the room by means of the outlet switching means, and by activating the heating means as well as the blast means, the adsorbability of the first adsorbent can be recovered and the second adsorbent can be saturated with the adsorbed moisture.

According to a third aspect of the invention, there is provided a cooling apparatus comprising:

a radiator-type adsorber in which moisture contained in air in a flow path is adsorbed by a first adsorbent and a heat of adsorption generated by the adsorption of the moisture is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via the radiator-type adsorber and the desorption cooler, to an outlet of air;

outlet switching means for switching the outlet of air from/to an inside of a room to/from an outside thereof; and heating means for heating the first adsorbent in the adsorber such that the moisture is desorbed from the first adsorbent.

This third cooling apparatus has the same structure as the foregoing second cooling apparatus, except that the radiator is removed therefrom.

The third cooling apparatus having no radiator is also capable of operating in the aforementioned cooling mode. More particularly, as in the first and second cooling apparatuses, by switching the outlet of air to the inside of the room by means of the outlet switching means, and by activating the blast means without activating the heating means, air cooling can be accomplished inside the room.

Differently from the foregoing first and second cooling apparatuses, there is no radiator provided in the third cooling apparatus. However, since the third cooling apparatus has the radiator-type adsorber which is the same as that of the second cooling apparatus, the heat of adsorption can be outwardly released from the radiator-type adsorber. In other words, the third cooling apparatus can be realized on the premise that the radiator-type adsorber has a sufficiently high heat radiating capacity. By removing the radiator, the entire structure of the cooling apparatus can be made more simple.

Also, the third cooling apparatus having no radiator is capable of operating in the aforementioned reproducing mode as well. More particularly, as in the first and second cooling apparatuses, by switching the outlet of air to the outside of the room by means of the outlet switching means, and by activating the heating means as well as the blast means, the adsorbability of the first adsorbent can be recovered and the second adsorbent can be saturated with the adsorbed moisture.

According to a fourth aspect of the invention, in addition to the structure of any of the foregoing first through third cooling apparatuses, the cooling apparatus may further comprise at least one auxiliary cooling mechanism having:

flow diverting means for diverting part of the air flowing through a main course of the flow path to a side course thereof;

an auxiliary desorption cooler in which moisture is desorbed from the second adsorbent into the air flowing through the side course of the flow path, thereby cooling the air in the side course of the flow path; and a heat exchanger by which heat exchange is allowed between the air in the main course of the flow path and the air in the side course thereof, which has been cooled by the auxiliary desorption cooler, thereby cooling the air in the main course of the flow path, the at least one auxiliary cooling mechanism being disposed in an upper course of the flow path relative to the desorption cooler such that the air cooled by passing through the main course of the flow path in the at least one auxiliary cooling mechanism is subsequently flowed into the desorption cooler.

In this fourth cooling apparatus, the auxiliary cooling mechanism is provided in the upper course of the flow path relative to the desorption cooler, more particularly, it is provided in the flow path between the radiator and the desorption cooler in the case of the structure of the first or second cooling apparatus, and in the flow path between the radiator-type adsorber and the desorption cooler in the case of the structure of the third cooling apparatus.

Also, one or more auxiliary cooling mechanisms may be provided, and each of the auxiliary cooling mechanisms is composed of the flow diverting means, the auxiliary desorption cooler and the heat exchanger. When the fourth cooling apparatus is operated in the cooling mode, the air diverted and introduced, by the flow diverting means, into the side course of the flow path is a low-humidity air that has already passed through the adsorber. Accordingly, once the low-humidity air is flowed into the auxiliary desorption cooler, moisture adsorbed by the second adsorbent during the operation in the reproducing mode is desorbed therefrom. With this desorption of the moisture, heat is removed from the air, and thus, the temperature of the air in the side course of the flow path is lowered. Subsequently, in the heat exchanger, heat exchange is allowed between the air in the main course of the flow path and the air in the side course of the flow path, which has been cooled by the auxiliary desorption cooler, thereby cooling the air in the main course of the flow path. As a result, the air flowing through the main course of the flow path has an absolute humdity equal to that of the air having passed through the adsorber and a temperature lower than that of the air having passed through the adsorber only. Accordingly, by flowing the resulting air through the desorption cooler, the air finally discharged into the room can further be cooled.

On the other hand, when the fourth cooling apparatus is operated in the reproducing mode, the air diverted and introduced, by the flow diverting means, into the side course of the flow path is a high-humidity air that has been humidified with the reproduction of the first adsorbent in the adsorber. Accordingly, once the high-humidity air is flowed into the auxiliary desorption cooler, moisture is adsorbed by the second adsorbent. As a result, the second adsorbent is saturated with the adsorbed moisture and the desorption cooling capacity of the second adsorbent is thus recovered.

In cases where two or more auxiliary cooling mechanisms are provided, they are usually arranged in series such that the air having passed through the main course of the flow path in the first auxiliary cooling mechanism subsequently passes through the main courses of the flow path in the second and, if any, further auxiliary cooling mechanisms in turn. By this arrangement, the air can be cooled in stages by passing through each of the plurality of auxiliary cooling mechanisms. It is also possible to arrange two or more auxiliary cooling mechanisms in parallel, more particularly, to arrange them on each of two or more branch flow paths, the branch flow paths being separated in midstream of the entire flow path and merging into each other again. In this case, the air introduced into each of the branch flow paths only passes through one of the plurality of auxiliary cooling mechanisms and, therefore, the air is not cooled in stages, unlike the case where the plurality of auxiliary cooling mechanisms are arranged in series.

According to a fifth aspect of the invention, there is provided a cooling apparatus in which:

the first adsorbent has a 10% or more difference between its moisture absorption percentage at 0% relative humidity and that at 50% relative humidity; and the second adsorbent has a 10% or more difference between its moisture absorption percentage at 60% relative humidity and that at 100% relative humidity.

In this fifth cooling apparatus, an adsorbent having a difference of 10% or more between its moisture absorption percentage at a relative humidity of 0% and that at a relative humidity of 50% is used as the first adsorbent. As a representative example of such an adsorbent, a silica gel of a micro-pore type having an average pore size of approximately 2 to 5 nm (for example, A-type silica gel) can be given. Also, an adsorbent having a difference of 10% or more between its moisture absorption percentage at a relative humidity of 60% and that at a relative humidity of 100% is used as the second adsorbent. As a representative example of such an adsorbent, a silica gel of a mezzo-pore type having an average pore size of approximately 5 to 10 nm (for example, B-type silica gel) can be given.

In the fifth cooling apparatus, the first adsorbent has a high adsorbability in a relatively low-humidity atmosphere and, therefore, the first adsorbent is preferably used to obtain a low-humidity air in the cooling mode. On the contrary, the second adsorbent is capable of adsorbing a large quantity of moisture in a relatively high-humidity atmosphere. In addition, the second adsorbent has a tendency to relatively easily desorb the moisture adsorbed thereonto, compared to the aforementioned first adsorbent. Accordingly, the second adsorbent is preferably used to humidify the air in the cooling mode.

Now, each of the foregoing cooling apparatuses can recover its cooling capacity through the operation in the reproducing mode, following the operation in the cooling mode. However, there is a limit to the cooling performance by each of the foregoing cooling apparatuses, since they can provide no cooling effect while being operated in the reproducing mode.

Such a limit is not a serious problem if operating hours in the reproducing mode can be sufficiently secured following continuous operating hours in the cooling mode, especially, in cases where, for example, in a factory or the like, the cooling apparatus is operated in the cooling mode during the day, and operated in the reproducing mode during the night.

However, in cases where even a bare minimum of operating hours in the reproducing mode can not be secured following the continuous operating hours in the cooling mode, a time during which the cooling apparatus is capable of continuously operating in the cooling mode next time is shortened and, therefore, the cooling capacity of the cooling apparatus is deteriorated in a short period of time.

In order to solve the aforementioned problem, according to a sixth aspect of the invention, there is provided a cooling system comprising a plurality of cooling apparatuses as mentioned above, wherein each of the plurality of cooling apparatuses is operated in two operational modes; one of the two operational modes being a cooling mode in which the outlet of air is switched to the inside of the room by means of the outlet switching means and the blast means is activated while the heating means is not activated; the other being a reproducing mode in which the outlet of air is switched to the outside of the room by means of the outlet switching means and the heating means as well as the blast means are activated; and the two operational modes are alternately repeated by each of the plurality of cooling apparatuses, while control is made in such a manner that at least one of the plurality of cooling apparatuses is operated in the cooling mode.

In this cooling system, the plurality of cooling apparatuses are respectively operated in the two operational modes repeatedly by turns. In addition, control is always made in such a manner that at least one of the plurality of cooling apparatuses is operated in the cooling mode. As a result, as soon as the cooling capacity of one of the plurality of cooling apparatuses falls below a necessary level, another cooling apparatus can be started to operate in the cooling mode. In this manner, a continuous cooling of air is made possible.

By adopting this cooling system, cooling can be performed without problems even in cases where the operating hours in the cooling mode need to be longer than those in the reproducing mode, especially, even in cases where a full-time operation in the cooling mode might be required.

BRIEF DESCRIPTION OF THE DRAWINGS

The present invention will now be described, by way of example, with reference to the accompanying drawings, in which.

DESCRIPTION OF THE PREFERRED EMBODIMENTS

[First Embodiment]

Figure 1:
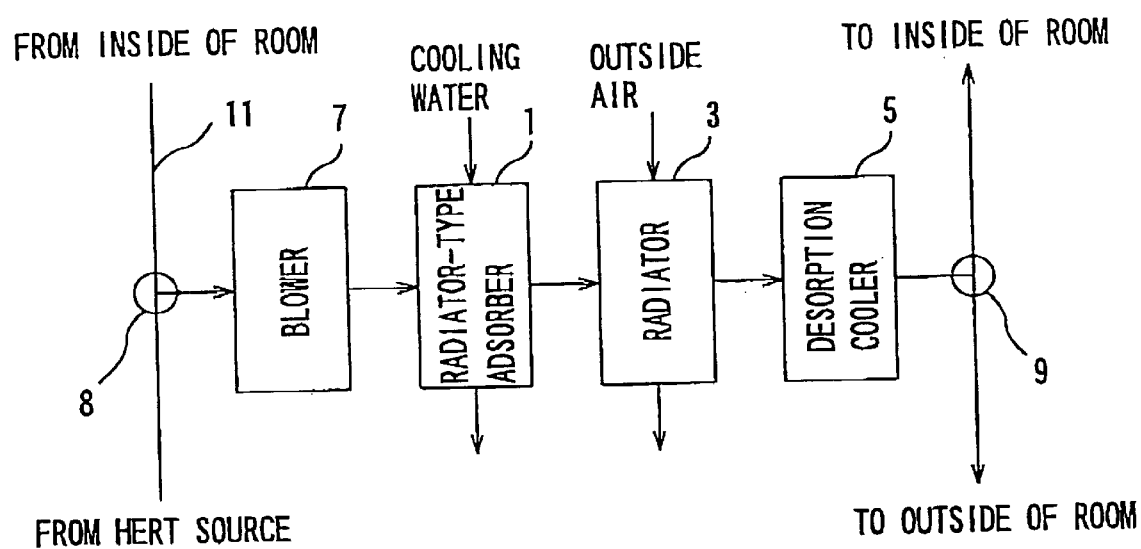
FIG. 1 is a block diagram of a cooling apparatus according to a first embodiment of the invention.

As shown in FIG. 1, a cooling apparatus according to a first embodiment comprises a radiator-type adsorber 1, a radiator 3, a desorption cooler 5, a blower 7, a first damper 8 and a second damper 9, all of which are connected by means of a pipe arrangement 11.

Figure 2:
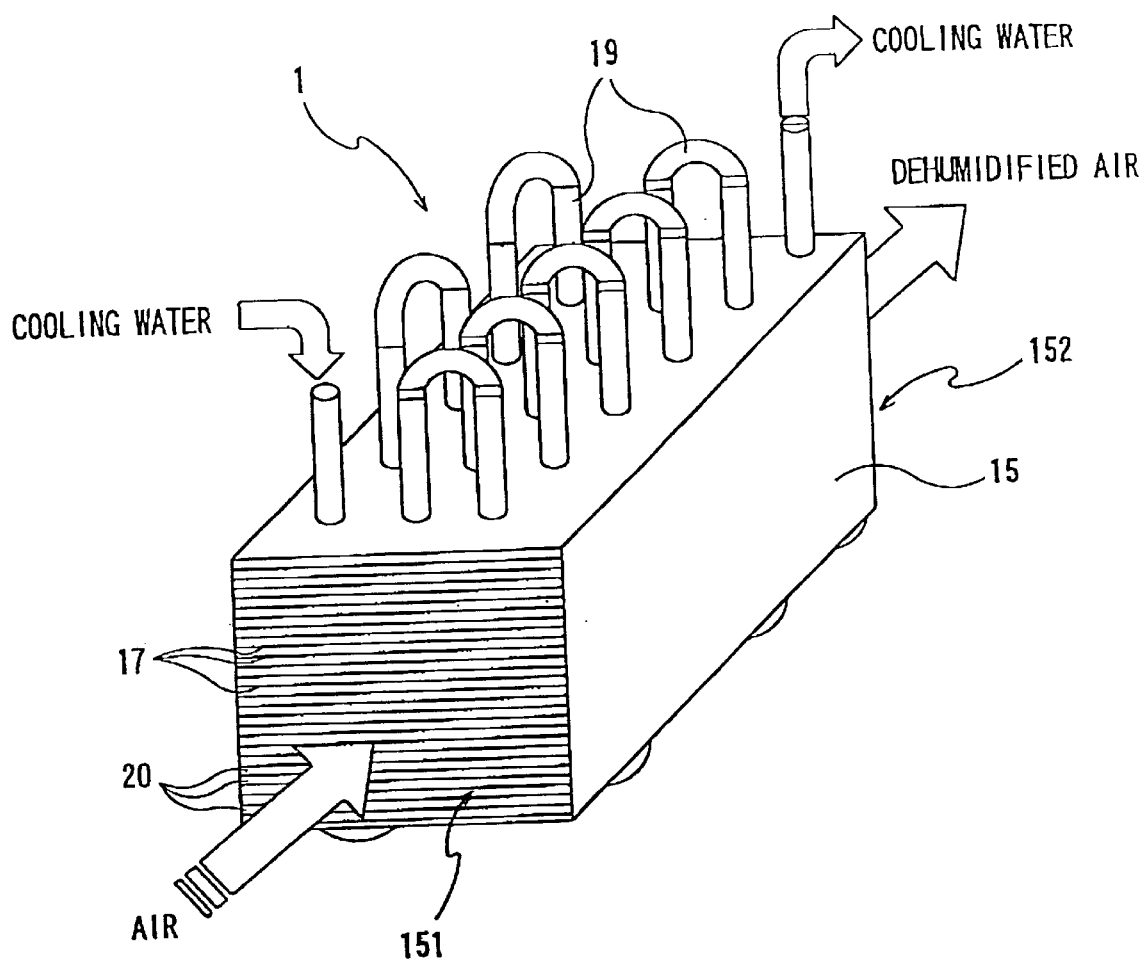
FIG. 2 shows an example of a radiator-type adsorber.

As shown in FIG. 2, the radiator-type adsorber 1 is a multi-shelves adsorber of a heat-exchanger type. The radiator-type adsorber 1 comprises a housing 15 having openings 151 and 152 at both ends, a large number of metallic plates 17 horizontally disposed inside the housing 15, a metallic conduit 19 penetrating the housing 15 and the metallic plates 17, and filling layers 20 filled with A-type silica gel, the filling layers 20 being disposed between the metallic plates 17 adjacent to each other. Air sent by the blower 7 is flowed into the housing 15, via one end thereof, and flowed through spaces between the large number of metallic plates 17, and then flowed out of the housing 15, via the other end thereof. When the air passes through the spaces between the metallic plates 17, the air is brought into contact with the A-type silica gel The opening 151 is an inlet of the air, and the opening 152 is an outlet thereof.

Each of the metallic plates 17 is a tin plate of 10 cm by 20 cm, and twenty metallic plates 17 are disposed in parallel, being spaced out by 5 mm, within the housing 15. As aforementioned, the spaces between the metallic plates 17 adjacent to each other are filled with the A-type silica gel, however, there are gaps ensured for passage of air.

The metallic conduit 19 is a copper pipe having an outer diameter of 6 mm and having a shape, as shown in FIG. 2, in which the pipe is turned up and down with a predetermined spacing. Cooling water is flowed through the inside of the metallic conduit 19. The metallic conduit 19 functions as a heat conductive member of the radiator-type adsorber 1. More particularly, the metallic conduit 19 is capable of transferring a heat of adsorption, which is generated when moisture is adsorbed by the A-type silica gel in the radiator-type adsorber 1, to the cooling water flowing through the metallic conduit 19, and then emitting the heat of adsorption out of the radiator-type adsorber 1.

The A-type silica gel filling the spaces between the metallic plates 17 has a high adsorbability in a relatively low-humidity range, a difference between its moisture absorption percentage at 0% relative humidity and that at 60% relative humidity being 10% or more.

The radiator 3 is a known crossflow heat exchanger, in which heat of the air passing through a flow path interiorly provided is transferred to fins arranged outside the flow path and the fins are winded to facilitate radiation of the heat.

Figure 3A:
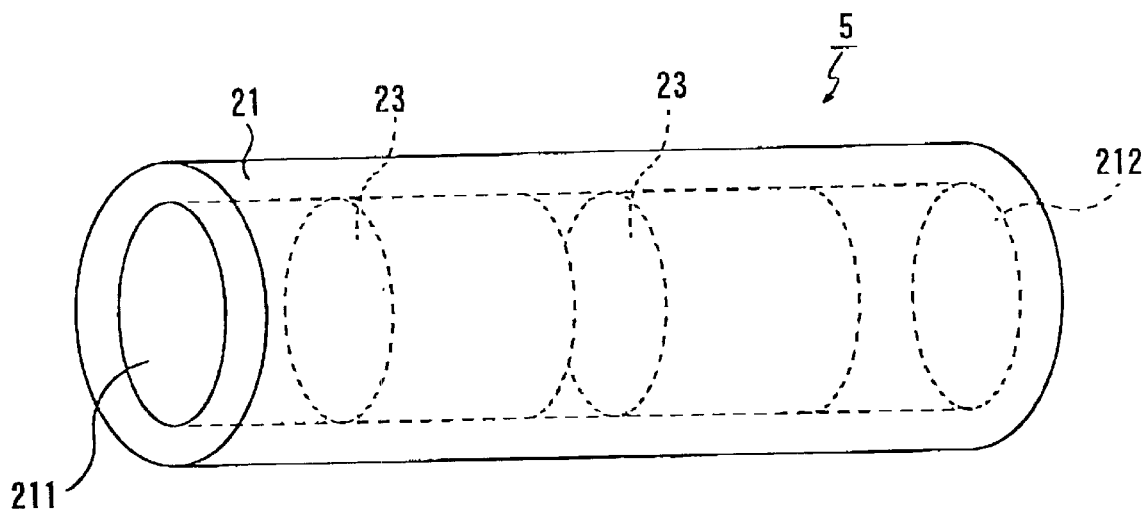
FIG. 3A is a perspective view of an example of a desorption cooler.

The desorption cooler 5 is, as shown in FIG. 3A, composed of a heat insulating housing 21, made of hard urethane foam, having openings 211 and 212 at both ends and two honeycomb formed bodies 23 arranged in the heat insulating housing 21.

Figure 3B:
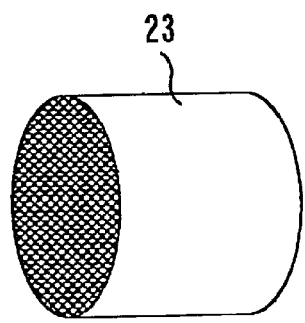
FIG. 3B is a perspective view of a honeycomb formed body arranged therein.

Each of the two honeycomb formed bodies 23 is, as shown in FIG. 3B, a formed body having a honeycomb-like internal structure, and formed out of a composition composed of B-type silica gel (corresponding to a second adsorbent in the invention) as a main component, with an appropriate amount of binder or the like added thereto. The B-type silica gel has a high adsorbability in a relatively high-humidity range, a difference between its moisture absorption percentage at 60% relative humidity and that at 100% relative humidity being 10% or more. Also, both of the two honeycomb formed bodies 23 have the same outer shape and the same weight, the former being a cylindrical shape of 10 cm in diameter and 10 cm in height, and the latter being 200 g for each.

The blower 7 is a device for flowing the air through the pipe arrangement 11 (corresponding to blast means in the invention). In this embodiment, a known fan, which is capable of sending air by means of revolution of a propeller, is used as the blower 7.

The first damper 8 is a device for switching an inlet of air from/to an inside of a room to/from a heat source (combinational use of the first damper 8 and the heat source corresponding to heating means in the invention). By switching the inlet of air to the heat source, the A-type silica gel in the radiator-type adsorber 1 is heated. In this embodiment, waste heat emitted from plant facilities is utilized as the heat source.

The second damper 9 is a device for switching an outlet of air from/to the inside of the room to/from an outside thereof (corresponding to outlet switching means in the invention).

In the cooling apparatus having the aforementioned structure, by switching the inlet of air to the inside of the room by means of the first damper 8, by switching the outlet of air to the inside of the room by means of the second damper 9, by circulating cooling water in the metallic conduit 19 in the radiator-type adsorber 1, and by activating the blower 7, the air introduced from the inside of the room is discharged into the room, after passing through the radiator-type adsorber 1, the radiator 3, and the desorption cooler 5. This operational status is referred to as a cooling mode.

When the cooling apparatus is operated in the cooling mode, in the radiator-type adsorber 1, moisture contained in the air is adsorbed by the A-type silica gel, and the humidity of the air is thus lowered. Although a heat of adsorption is generated by the adsorption of the moisture, the heat of adsorption is transferred to the metallic conduit 19 to be outwardly radiated by the cooling water, thereby preventing an excessive rise in temperature within the radiator-type adsorber 1.

In this connection, when the air having a temperature of 30° C. and a relative humidity of 80% was flowed into the radiator-type adsorber 1 in such a manner that the outlet velocity of air was 1.8 m/s, temperature reached up to 60° C. within the radiator-type adsorber 1, without the circulation of cooling water in the metallic conduit 19. On the contrary, with the circulation of cooling water of 25° C. in the metallic conduit 19, a rise in temperature within the radiator-type adsorber 1 was reduced to such a degree that the temperature within the radiator-type adsorber 1 reached 45° C. at a maximum. Since the adsorbability per unit quantity of the A-type silica gel is higher at an atmospheric temperature of 45° C. than at an atmospheric temperature of 60° C., it can be said that heat radiation from within the radiator-type adsorber 1 contributes to an improvement in a capacity of adsorption in the radiator-type adsorber 1.

Now, the air flowed out of the radiator-type adsorber 1 is flowed into the radiator 3, where the temperature of the air is lowered up to a temperature approximately same as the outside air temperature (for example, 30° C.). The air is then flowed into the desorption cooler 5.

In the desorption cooler 5, moisture is desorbed from the B-type silica gel. With the desorption of the moisture, heat is removed from the air and, consequently, the temperature of the air is lowered below the outside air temperature. The air of which the temperature has thus been lowered is finally discharged into the room, thereby achieving cooling in the room.

In fact, when the air was 29.7° C. in temperature and 3% in relative humidity after flowing out of the radiator 3 and before flowing into the desorption cooler 5, it was 13.2° C. in temperature and 71% in relative humidity after flowing out of the desorption cooler 5.

As the cooling apparatus is continuously operated in the cooling mode, the adsorbability of the A-type silica gel in the radiator-type adsorber 1 is gradually lowered. At the same time, the desobability of the B-type silica gel in the desorption cooler 5 is gradually deteriorated as well. The time until the cooling capacity has substantially been lost depends on the quantities of the A-type and B-type silica gels, the amount of an air blow, temperature and humidity conditions, or the like. In addition, cooling capacities required by users differ. Therefore, a criterion on the basis of which it is determined that the cooling capacity has been lost may be changed accordingly. For example, it can be determined that the cooling capacity has been lost when a difference between the temperature of the air flowed into the radiator-type adsorber 1 and the temperature of the air flowed out of the desorption cooler 5 is smaller than a predetermined value. Otherwise, it may be determined that the cooling capacity has been lost when the temperature of the air flowed out of the desorption cooler 5 simply exceeds a target temperature. Also, by assuming a model case with a specific structure of an apparatus and with an average temperature condition, an average continuous cooling time can be calculated in advance. Then, it is possible to estimate the time during which the cooling capacity of the cooling apparatus will have been lost only on the basis of this time condition.

In any case, when it appears that the cooling capacity has been lost, by switching the inlet of air to the heat source by means of the first damper 8, by switching the outlet of air to the outside of the room by means of the second damper 9, by stopping the circulation of the cooling water in the metallic conduit 19 in the radiator-type adsorber 1, and by activating the blower 7, a high-temperature air introduced from the heat source is discharged outside the room after passing through the radiator-type adsorber 1, the radiator 3, and the desorption cooler 5. This operational status is referred to as a reproducing mode.

When the cooling apparatus is operated in the reproducing mode, in the radiator-type adsorber 1, the A-type silica gel is heated by the air introduced from the heat source, which results in desorption of the moisture adsorbed by the A-type silica gel during the operation in the cooling mode. As a result, the A-type silica gel is reproduced to recover its capacity for moisture absorption. Subsequently, the high-temperature air of which the humidity has been risen in the radiator-type adsorber 1 is flowed into the radiator 3, where the temperature of the air is lowered up to a temperature approximately same as the outside air temperature (for example, 30° C.). Then, the air is flowed into the desorption cooler 5.

In the desorption cooler 5, the moisture contained in the air is adsorbed by the B-type silica gel, from which moisture has been desorbed during the operation in the cooling mode, with the result that the B-type silica gel is saturated with the adsorbed moisture and its capacity for desorption cooling is thus recovered. The air flowed out of the desorption cooler 5 is finally discharged outside the room.

As mentioned above, in the cooling apparatus according to this embodiment, cooling of air is achieved by desorption of moisture from the B-type silica gel in the desorption cooler 5. In this case, a moisture content in the air discharged into the room never goes beyond a saturated vapor amount and generation of a mist is thus prevented, unlike the case where humidification is compulsorily performed by means of a humidifier in a conventional cooling apparatus. As a result, with the use of the cooling apparatus according to this embodiment, the humidity of the air in the room is not made excessively high and, therefore, amenity is not lost inside the room, compared to the case of humidification by use of a humidifier.

Also, in the case of the cooling apparatus according to this embodiment, it is unnecessary to provide a humidifier itself, a pipe arrangement for supply of water to the humidifier, or the like and, therefore, the entire structure of the cooling apparatus can be made compact.

Furthermore, the moisture desorbed from the B-type silica gel in the desorption cooler 5 is the moisture collected from the air by the A-type silica gel in the radiator-type adsorber 1 during the operation in the cooling mode, and then transferred to the B-type silica gel in the desorption cooler 5 during the operation in the reproducing mode. This means that provision of a feed water tank for storage of water for humidification, or use of a water supply system to utilize service water or ground water as water for humidification, or the like is not necessary at all. Accordingly, the trouble in resupplying water into the feed water tank can be saved. Moreover, since the water supply system, which is immovably provided, is not utilized, a cooling apparatus, for example, for automobile use, which is not to be located in a fixed position, can be realized as well.

In addition, in the cooling apparatus according to this embodiment, directions in which the air is blown by the blower 7 are the same in both of the cooling and reproducing modes. Also, the blower 7 can be kept activated all the time regardless of these operational modes, which makes it unnecessary to control the blower 7 each time the operational modes are switched over. In other words, compared to a cooling apparatus in which switching control for the air blowing directions is required, control of the blower 7 is easier in the cooling apparatus according to this embodiment.

With respect to the means for switching courses of the flow path of the air, provision of at least the second damper 9 will do. In this case, control of the second damper 9 is also easier, compared to the case where a complicated switching control for such courses of the flow path is necessary to be performed by means of several dampers. Here, in the above described embodiment, the first damper 8 is also provided for selective introduction of the air from the heat source. Instead, heating wires or the like may be provided in the radiator-type adsorber 1 for the purpose of heating reproduction.

A preferred embodiment of the present invention has been described above; however, the invention is, of course, not restricted to such a specific embodiment and may be practiced or embodied in still other ways, without departing from the subject matter thereof. Several other embodiments will now be described below, focussing on differences from the foregoing first embodiment and avoiding repetition of reference to the common parts.

[Second Embodiment]

Figure 4:
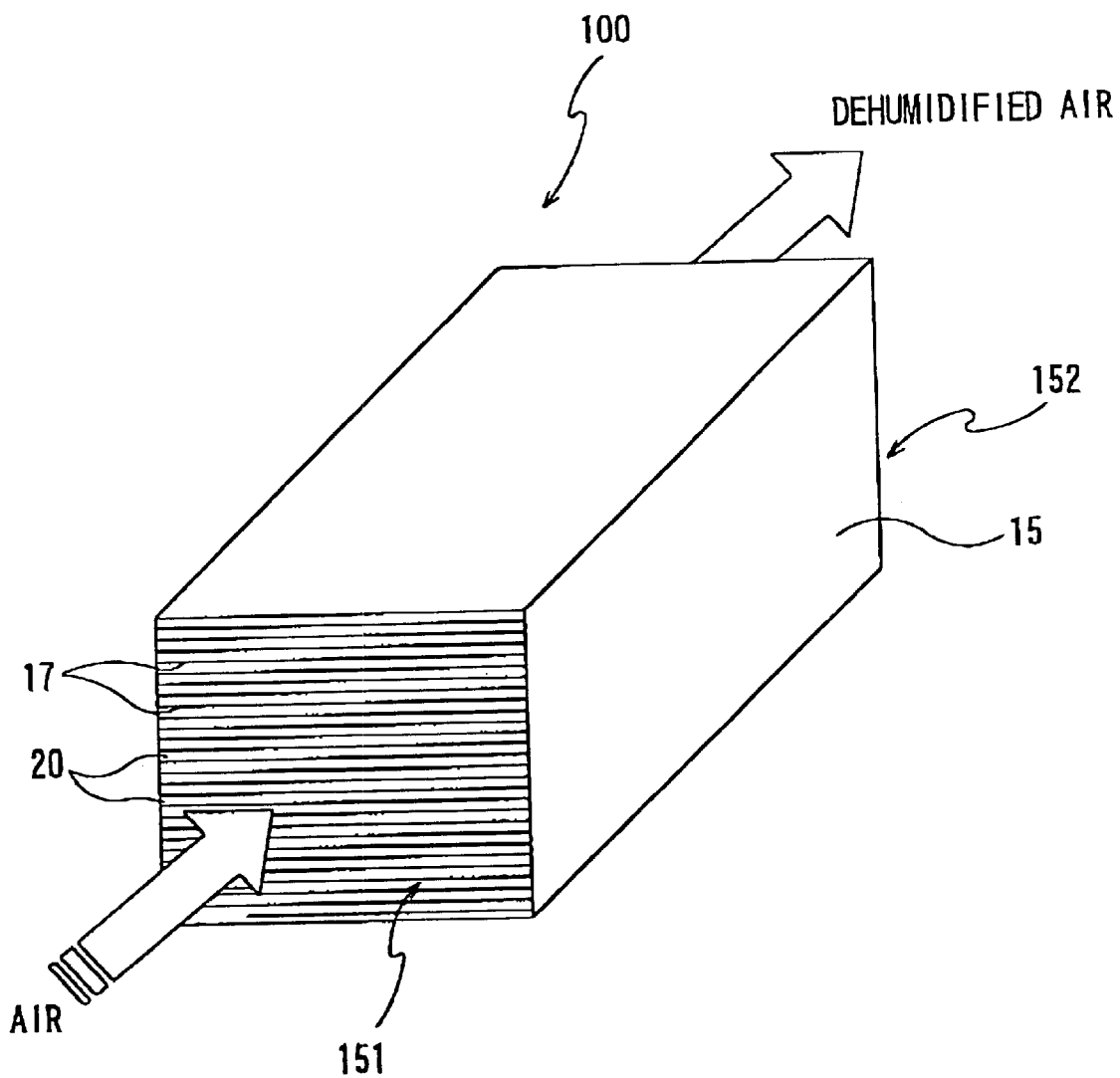
FIG. 4 is a perspective view of an adsorber having no heat-exchanging means.

In the foregoing first embodiment, the heat of adsorption is outwardly emitted by means of the heat conductive member provided in the radiator-type adsorber 1. Instead of the radiator-type adsorber 1, as shown in FIG. 4, a multi-shelves-type adsorber 100 comprising no heat conductive member, or no heat exchanger, may be used. The other components of the adsorber 100 are the same as those of the radiator-type adsorber 1 as shown in FIG. 2 and, therefore, they are denoted by the same reference numerals and description thereof is not repeated here.

In the case of use of such an adsorber 100 with no heat conductive member, the temperature within the adsorber 100 tends to reach higher compared to the case of use of the radiator-type adsorber 1. Accordingly, the adsorbability per unit quantity of an adsorbent (the first adsorbent) disposed in the adsorber 100 is deteriorated; however, this can be made up for by increasing an absolute quantity of the adsorbent to be used, and in this case, there will be no problem as long as a sufficient space for installation of the cooling apparatus is available.

Also, in the case of use of the adsorber 100 having no heat conductive member, there is no possibility of loss of heat in the adsorber 100, via the heat conductive member, at the time of heating reproduction of the adsorbent disposed in the adsorber 100, which results in an efficient use of the heat applied for such heating reproduction into the adsorber 100.

[Third Embodiment]

In the foregoing first embodiment, after the heat of adsorption is outwardly radiated by means of the radiator-type adsorber 1, the heat remaining in the air is further radiated by means of the radiator 3. Alternatively, in cases where the capacity for heat radiation of the radiator-type adsorber 1 is sufficiently high, the radiator 3 may be removed. In this case, the entire structure of the cooling apparatus can be simplified because of removal of the radiator 3.

[Fourth Embodiment]

In the foregoing first embodiment, the high-temperature air is introduced from the heat source by means of the first damper 8. Instead of use of the first damper 8, or in addition thereto, hot water heated at the heat source may be introduced into the absorber for heating within the adsorber. In this case, another pipe arrangement may be provided appropriately only for the purpose of introducing the hot water into the adsorber. Otherwise, the metallic conduit 19 provided for the purpose of cooling may be modified such that the hot water can be selectively introduced into the metallic conduit 19 and, in the reproducing mode, the metallic conduit 19, which is originally a heat conductive member for heat radiation, is also capable of functioning as means for heating the adsorber.

Figure 5:
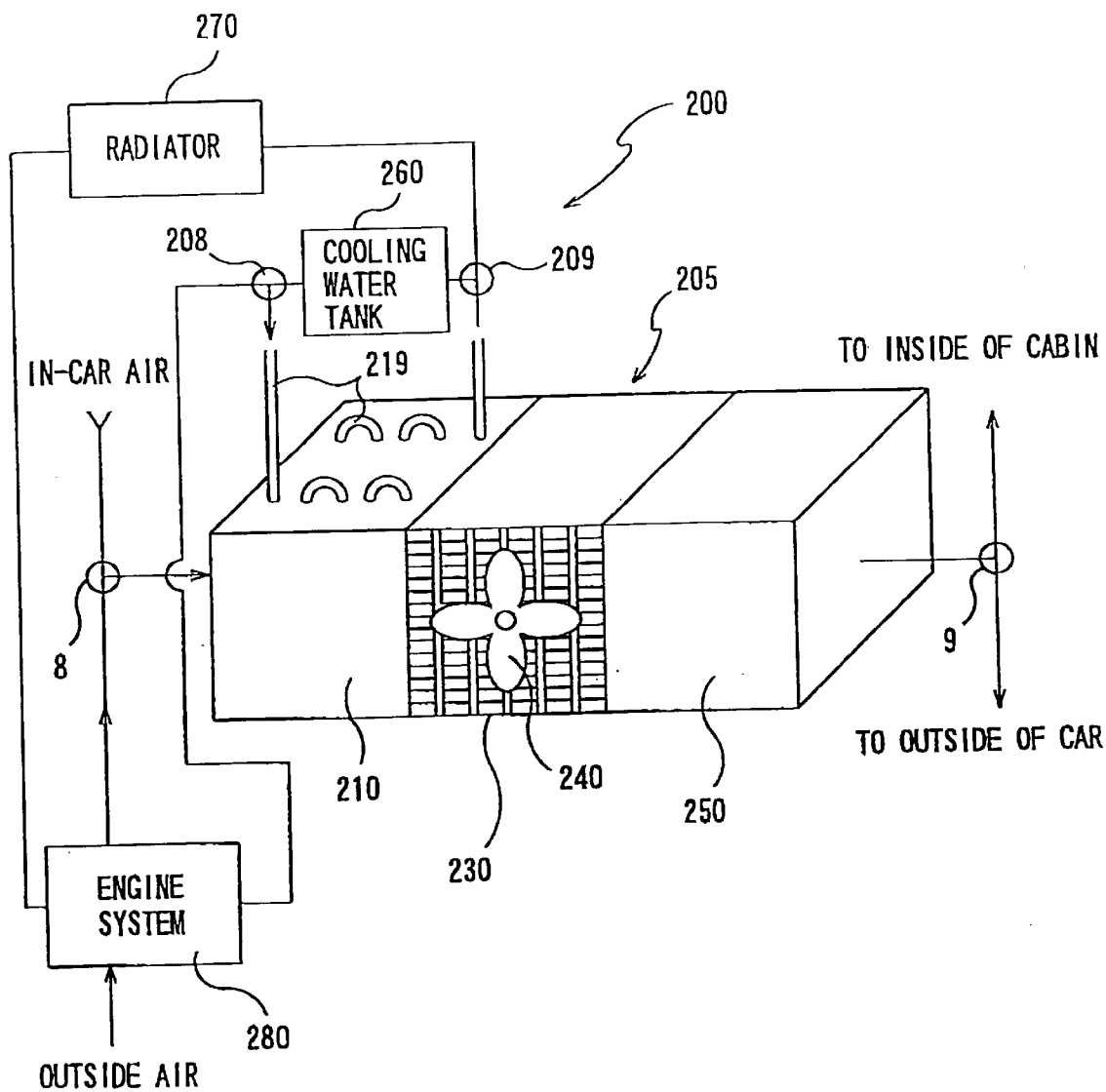
FIG. 5 is a block diagram of a cooling apparatus according to a fourth embodiment of the invention.
Figure 6:
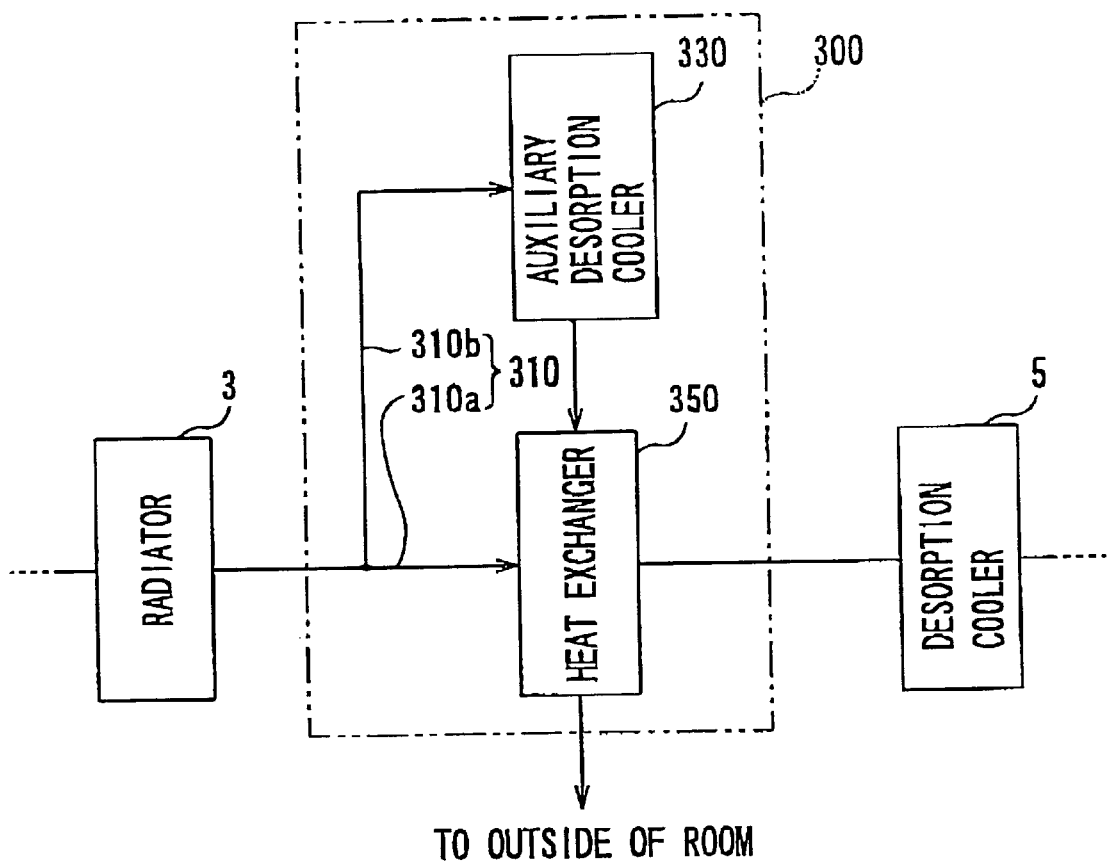
FIG. 6 is a block diagram of an auxiliary cooling mechanism provided in a cooling apparatus according to a fifth embodiment of the invention.

As a cooling apparatus adopting such structure, a cooling apparatus to be installed in a car is shown in FIG. 5. The cooling apparatus 200 includes an all-in-one cooling unit 205 comprising a radiator-type adsorber 210, a radiator 230, and a desorption cooler 250. Although the radiator-type adsorber 210, the radiator 230, and the desorption cooler 250 are respectively the same as those in the first embodiment, in this embodiment, these components are all connected and integrated as one unit. In addition, in front of the radiator 230, a fan 240 for sending cooling air to the radiator 230 is provided.

During the operation in the cooling mode, cooling water having a relatively low temperature (for example, 25° C.) is supplied from a cooling water tank 260 for storage of cooling water into a metallic conduit 219 of the radiator-type adsorber 210. On the other hand, during the operation in the reproducing mode, cooling water having a relatively high temperature (for example, 80° C.) is supplied from a radiator 270 for cooling an engine, by way of an engine system 280, into the metallic conduit 219. For switching the supply between the relatively low-temperature cooling water and the relatively high-temperature cooling water depending on the operational modes, dampers 208 and 209 are connected to either end of the metallic conduit 219 of the radiator-type adsorber 210.

Also, during the operation in the cooling mode, air is supplied from a cabin of the car into the radiator-type adsorber 210, while during the operation in the reproducing mode, air that has been heated in the engine system 280 is supplied into the radiator-type adsorber 210 for heating thereof. More specifically, it is preferable to supply air that has been heated by an engine of the car into the radiator-type adsorber 210. Alternatively, in the case of a turbocharged car, part of air that has been heated by a turbocharger may be supplied into the radiator-type adsorber 210.

Now, operation of the cooling apparatus as shown in FIG. 5 is described.

When the cooling apparatus is operated in the cooling mode, air in the cabin is first introduced, via the damper 8, into the cooling unit 205, and flowed through the radiator-type adsorber 210, the radiator 230, and the desorption cooler 250, and then discharged into the cabin via the damper 9. At the same time, in this cooling mode, cooling water sent from the cooling water tank 260 is introduced, via the damper 208, into the metallic conduit 219 of the radiator-type adsorber 210 and returned, via the damper 209, to the cooling water tank 260, thereby cooling the radiator-type absorber 210. Functions of each component in the cooling mode are as described so far, and the description is not repeated here. Although it is not illustrated in FIG. 5, a pump is incorporated in the cooling water tank 260 for the purpose of sending out the cooling water.

In order to switch from the cooling mode to the reproducing mode, each of the dampers 8, 9, 208 and 209 is switched over. When the cooling apparatus is operated in the reproducing mode, air taken from the atmosphere into the engine system 280 is introduced, via the damper 8, into the radiator-type adsorber 210. The introduced air has been heated in the engine system 280. The high-temperature air is flowed through the radiator-type adsorber 210, the radiator 230, and the desorption cooler 250, and then discharged to the outside of the car via the damper 9. At the same time, in this reproducing mode, cooling water having a relatively high temperature, which has been heated in the engine system 280, sent from the radiator 270 is introduced, via the damper 208, into the metallic conduit 219 of the radiator-type adsorber 210 and returned, via the damper 209, to the radiator 270. Functions of each component in the reproducing mode are as described so far, and the description is not repeated here.

[Fifth Embodiment]

In the foregoing first embodiment, the air flowed out of the radiator 3 was directly flowed into the desorption cooler 5. Alternatively, if it is desired that the temperature of the air flowed out of the desoprtion cooler 5 into the room should be made much lower, an auxiliary cooling mechanism 300, as shown in FIG. 4, may be provided between the radiator 3 and the desorption cooler 5.

The auxiliary cooling mechanism 300 comprises a pipe arrangement 310 (corresponding to flow diverting means in the invention) for sending part of the air flowing through a main flow path 310a into a side flow path 310b, an auxiliary desorption cooler 330 for cooling the air flowing through the side flow path 310b by having moisture desorbed from B-type silica gel (corresponding to the second adsorbent in the invention) into the air in the side flow path 310b, and a heat exchanger 350 for cooling the air flowing through the main flow path 310a by heat exchange between the air in the main flow path 310a and the air in the side flow path 310b that has been cooled by the auxiliary desorption cooler 330. Although the auxiliary desorption cooler 330 is named differently from the desorption cooler 5, this is to make a distinction between the two and their basic structures are the same.

When the cooling apparatus is operated in the cooling mode, the air flowing through the pipe arrangement 310 is a low-humidity air, that has already passed through the radiator-type adsorber 1. Accordingly, once the low-humidity air is flowed into the auxiliary desorption cooler 330, moisture is desorbed from the B-type silica gel disposed therein. By this desorption of the moisture, heat is removed from the air, thereby lowering the temperature thereof. Then, by the heat exchanger 350, heat exchange is allowed between the air in the main flow path 310a and the air in the side flow path 310b that has been cooled by the auxiliary desorption cooler 330, thereby cooling the air in the main flow path 310a. As a result, the air in the main flow path 310a is a low-humidity air of which the absolute humidity is the same as that of the air having passed through the radiator-type adsorber 1. In addition, the temperature of the air in the main flow path 310a is lower than that of the air having merely passed through the radiator-type adsorber 1. Accordingly, by flowing this air through the desorption cooler 5, the temperature of the air finally discharged into the room can further be lowered. On the other hand, when the cooling apparatus is operated in the reproducing mode, the air flowing through the pipe arrangement 310 is a high-humidity air, that has been humidified by the reproduction of the A-type silica gel disposed in the radiator-type adsorber 1. Accordingly, once the high-humidity air is flowed into the auxiliary desorption cooler 330, moisture is adsorbed by the B-type silica gel to such an extent that the B-type silica gel is saturated with the adsorbed moisture, and its capacity for desorption cooling is thus recovered.

Two or more auxiliary cooling mechanisms 300 as mentioned above may be provided according to need. In this case, the two or more auxiliary cooling mechanisms 300 are usually arranged in series such that the air having passed through the main flow path of the first auxiliary cooling mechanism 300 subsequently passes through the main flow path of the second auxiliary cooling mechanism 300 and, if more, through the main flow paths of further auxiliary cooling mechanisms 300 in turn. In this manner, the air can be cooled in stages by passing through each of the plurality of auxiliary cooling mechanisms 300.

However, it is also possible to arrange the two or more auxiliary cooling mechanisms 300 in parallel, more particularly, to arrange them on each of two or more branch flow paths, which are separated in midstream of the entire flow path and merge into each other again. In this case, the air introduced into each of the branch flow paths only passes through one of the plurality of auxiliary cooling mechanisms 300 and, therefore, the air is not cooled in stages, unlike the case where the plurality of auxiliary cooling mechanisms 300 are arranged in series.

In cases where, as mentioned in the foregoing third embodiment, the radiator 3 is removed, the auxiliary cooling mechanism 300 can be disposed between the radiator-type adsorber 1 and the desorption cooler 5.

[Sixth Embodiment]

In the foregoing first through fifth embodiments, each single cooling apparatus has been described. In the case of use of such a single cooling apparatus, however, operations in the cooling mode and in the reproducing mode are alternately repeated and, therefore, there is a limit to hours during which cooling effects can be obtained continuously.

In order to deal with this problem, a plurality of cooling apparatuses as aforementioned may be used to build a cooling system, in which the two operational modes are alternately repeated by each of the plurality of cooling apparatuses, while control is made in such a manner that at least one of the plurality of cooling apparatuses is operated in the cooling mode. Such a cooling system is preferably realized as follows.

Figure 7:
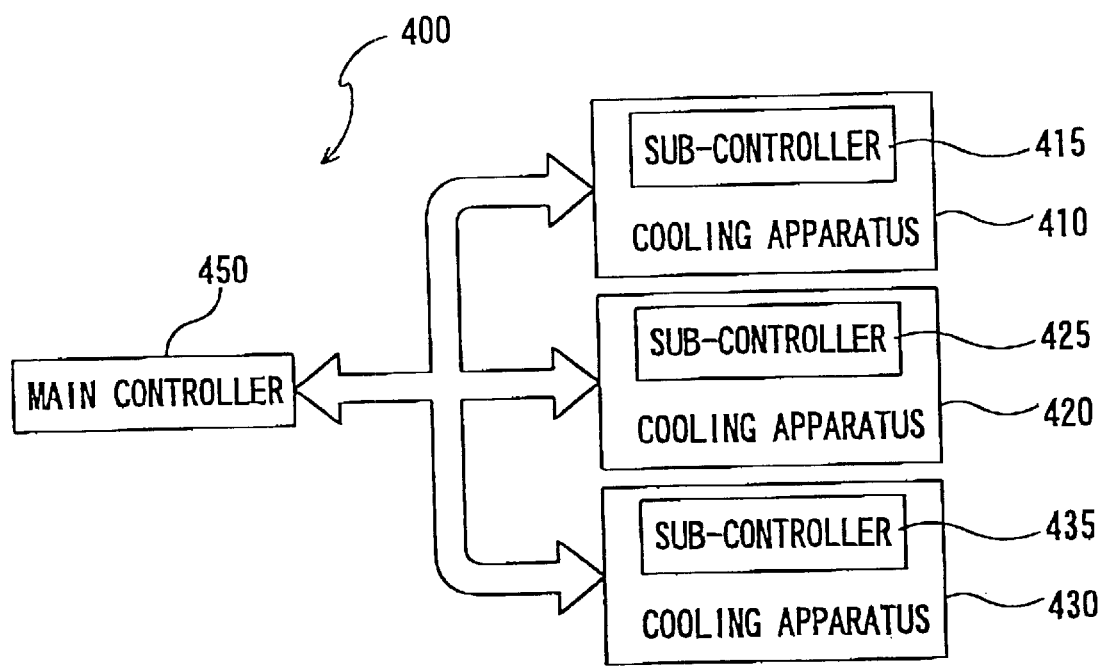
FIG. 7 is a block diagram of a cooling system according to a sixth embodiment of the invention.

As shown in FIG. 7, a cooling system 400 comprises a plurality of cooling apparatuses, for example, three cooling apparatuses 410, 420 and 430, and a main controller 450 for controlling operations of these cooling apparatuses 410, 420 and 430. Also, sub-controllers 415, 425 and 435 are provided in the cooling apparatuses 410, 420 and 430, respectively, for controlling the respective cooling apparatuses upon reception of control signals from the main controller 450.

Figure 8:
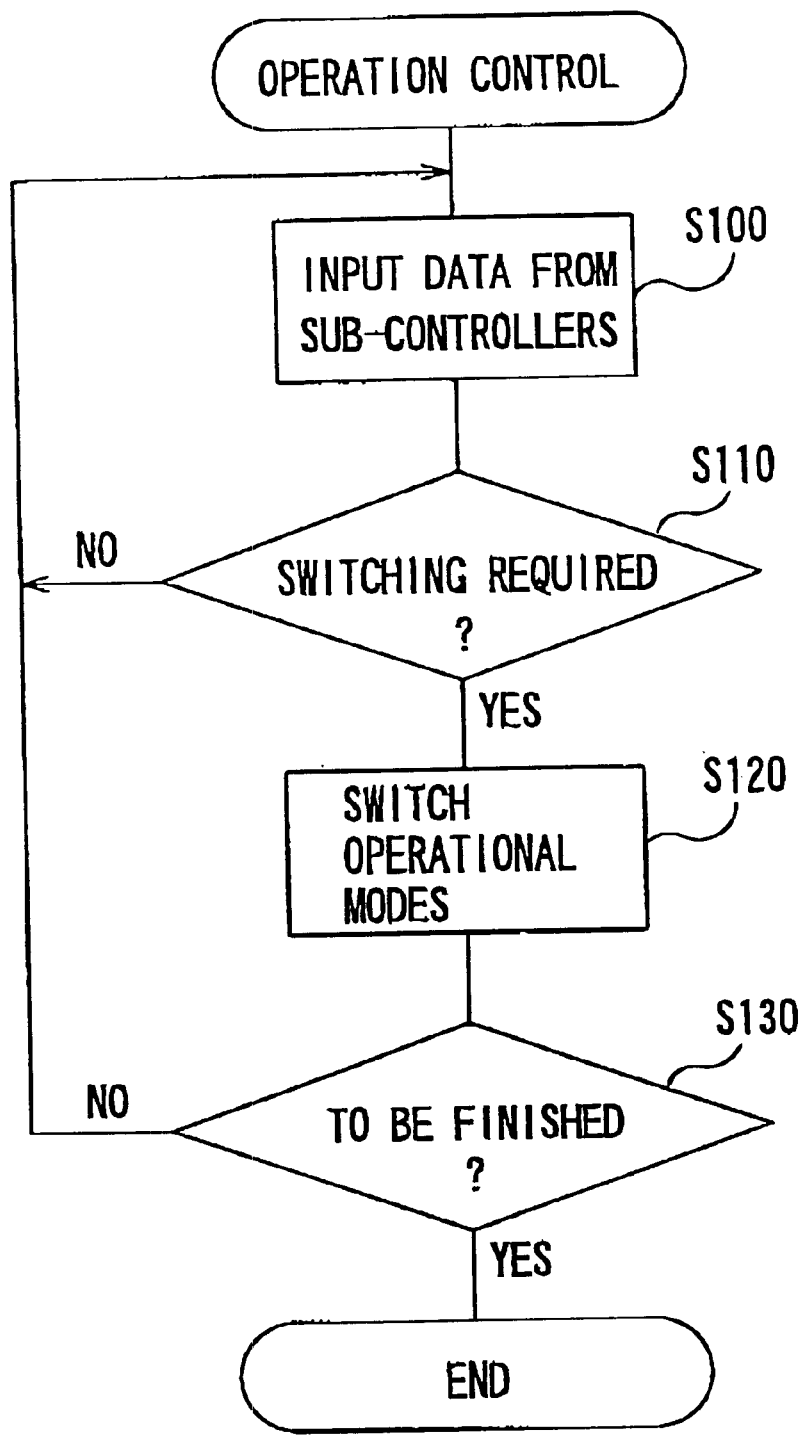
FIG. 8 is a flow chart showing an operation of the cooling system.

Operation control in the cooling system 400 as shown in FIG. 7 is conducted as follows. All of the cooling apparatuses 410, 420 and 430 are operated in the cooling mode at the initial stage of operation. Temperature and humidity obtained by each cooling apparatus are monitored by each sub-controller by means of sensors. Now, as shown in FIG. 8, data from each of the sub-controllers 415, 425, and 435 are inputted into the main controller 450 at S100. Subsequently, at S110, it is determined whether or not the operational modes are necessary to be switched over. In cases where, in each cooling apparatus, a difference between the temperature of the air introduced into the radiator-type adsorber and the temperature of the air flowed out of the desorption cooler becomes smaller than a predetermined temperature difference, it is determined that switching of the operational modes is necessary. However, in order for at least one of the cooling apparatuses to be operated in the cooling mode, as such a predetermined temperature difference, a value greater than that of a temperature difference predetermined in cases where a single cooling apparatus is used for cooling is adopted. In other words, switching to the reproducing mode is performed at an early stage in the cooling system comprising a plurality of cooling apparatuses. Then, among the three cooling apparatuses, any one that indicates a smallest temperature difference is first switched to operate in the reproducing mode, at the same time a predetermined value for determining the necessity of switching is set, in view of the time required for recovery of the functions of the adsorber and the desorption cooler, such that at least one of the three cooling apparatuses is operated in the cooling mode. If it is determined that switching is required, the two operational modes are switched over at S120. On the contrary, if it is determined, at S110, that switching is not required, processing proceeds to S100. At S130, it is determined whether or not an instruction for finishing the operation of the cooling system has been provided. If it is determined that such an instruction has not yet been provided, the processing proceeds to S100 again, while if it is determined that such an instruction has been provided, the processing is ended.

Instead of the aforementioned operational method, another method for switching the operational modes of the plurality of cooling apparatuses is also possible. That is, when cooling is started by switching on the cooling system, two of the three cooling apparatuses are first started to operate in the cooling mode, and when it becomes necessary that the two cooling apparatuses should be reproduced, the other of the three cooling apparatuses is started to operate in the cooling mode in turn. When the reproduction of the two cooling apparatuses has been finished, they are switched to operate in the cooling mode again, while the other is switched to operate in the reproducing mode. This cycle is then repeated.

In such a cooling system, since the plurality of cooling apparatuses are always controlled in such a manner that at least one of them is operated in the cooling mode, as soon as the cooling capacity of one of the plurality of cooling apparatuses falls below a necessary level, another cooling apparatus can be started to operate in the cooling mode. In this manner, continuous cooling is made possible without limitation.

What is claimed is:

1. A cooling apparatus comprising:
  an adsorber in which moisture contained in air in a flow path is adsorbed by a first adsorbent;
  a radiator in which heat of the air in the flow path is radiated out of the flow path via a heat conductive member;
  a desorption cooler in which moisture is desorbed from a second adsorbent into the air in the flow path, thereby cooling the air in the flow path;
  blast means for flowing the air through the flow path, said flow path running from an inlet of air, via said adsorber, said radiator and said desorption cooler, to an outlet of air;
  outlet switching means for switching the outlet of air from/to an inside of a room to/from an outside thereof;
  heating means for heating said first adsorbent in said adsorber such that the moisture is desorbed from said first adsorbent;
  further comprising at least one auxiliary cooling mechanism having:
    flow diverting means for diverting part of the air flowing through a main course of the flow path to a side course thereof;
    an auxiliary desorption cooler in which moisture is desorbed from the second adsorbent into the air flowing through the side course of the flow path, thereby cooling the air in the side course of the flow path; and
    a heat exchanger by which heat exchange is allowed between the air in the main course of the flow path and the air in the side course thereof, which has been cooled by said auxiliary desorption cooler, thereby cooling the air in the main course of the flow path, said at least one auxiliary cooling mechanism being disposed in an upper course of the flow path relative to said desorption cooler such that the air cooled by passing through the main course of the flow path in said at least one auxiliary cooling mechanism is subsequently flowed into said desorption cooler.

2. A cooling apparatus comprising:
  a radiator-type adsorber in which moisture contained in air in a flow path is adsorbed by a first adsorbent and a heat of adsorption generated by the adsorption of the moisture is radiated out of the flow path via a heat conductive member;
  a radiator in which heat of the air in the flow path is radiated out of the flow path via a heat conductive member;
  a desorption cooler in which moisture is desorbed from a second adsorbent into the air in the flow path, thereby cooling the air in the flow path;
  blast means for flowing the air through the flow path, said flow path running from an inlet of air, via said radiator-type adsorber, said radiator and said desorption cooler, to an outlet of air;
  outlet switching means for switching the outlet of air from/to an inside of a room to/from an outside thereof;
  heating means for heating said first adsorbent in said adsorber such that the moisture is desorbed from said first adsorbent;
  further comprising at least one auxiliary cooling mechanism having:
    flow diverting means for diverting part of the air flowing through a main course of the flow path to a side course thereof;
    an auxiliary desorption cooler in which moisture is desorbed from the second adsorbent into the air flowing through the side course of the flow path, thereby cooling the air in the side course of the flow path; and
    a heat exchanger by which heat exchange is allowed between the air in the main course of the flow path and the air in the side course thereof, which has been cooled by said auxiliary desorption cooler, thereby cooling the air in the main course of the flow path, said at least one auxiliary cooling mechanism being disposed in an upper course of the flow path relative to said desorption cooler such that the air cooled by passing through the main course of the flow path in said at least one auxiliary cooling mechanism is subsequently flowed into said desorption cooler.

3. A cooling apparatus comprising:

a radiator-type adsorber in which moisture contained in air in a flow path is adsorbed by a first adsorbent and a heat of adsorption generated by the adsorption of the moisture is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said radiator-type adsorber and said desorption cooler, to an outlet of air;

outlet switching means for switching the outlet of air from/to an inside of a room to/from an outside thereof;

heating means for heating said first adsorbent in said adsorber such that the moisture is desorbed from said first adsorbent;

further comprising at least one auxiliary cooling mechanism having:

flow diverting means for diverting part of the air flowing through a main course of the flow path to a side course thereof;

an auxiliary desorption cooler in which moisture is desorbed from the second adsorbent into the air flowing through the side course of the flow path, thereby cooling the air in the side course of the flow path; and a heat exchanger by which heat exchange is allowed between the air in the main course of the flow path and the air in the side course thereof, which has been cooled by said auxiliary desorption cooler, thereby cooling the air in the main course of the flow path, said at least one auxiliary cooling mechanism being disposed in an upper course of the flow path relative to said desorption cooler such that the air cooled by passing through the main course of the flow path in said at least one auxiliary cooling mechanism is subsequently flowed into said desorption cooler.

4. A cooling apparatus comprising:

an adsorber in which moisture contained in air in a flow path is adsorbed by a first adsorbent;

a radiator in which heat of the air in the flow path is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said adsorber, said radiator and said desorption cooler, to an outlet of air;

outlet switching means for switching the outlet of air from/to an inside of a room to/from an outside thereof; and heating means for heating said first adsorbent in said adsorber such that the moisture is desorbed from said first adsorbent;

said first adsorbent has a 10% or more difference between its moisture absorption percentage at 0% relative humidity and that at 50% relative humidity; and said second adsorbent has a 10% or more difference between its moisture absorption percentage at 60% relative humidity and that at 100% relative humidity.

5. A cooling apparatus comprising:

a radiator-type adsorber in which moisture contained in air in a flow path is adsorbed by a first adsorbent and a heat of adsorption generated by the adsorption of the moisture is radiated out of the flow path via a heat conductive member;

a radiator in which heat of the air in the flow path is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said radiator-type adsorber, said radiator and said desorption cooler, to an outlet of air;

outlet switching means for switching the outlet of air from/to an inside of a room to/from an outside thereof;

heating means for heating said first adsorbent in said adsorber such that the moisture is desorbed from said first adsorbent;

wherein said first adsorbent has a 10% or more difference between its moisture absorption percentage at 0% relative humidity and that at 50% relative humidity; and said second adsorbent has a 10% or more difference between its moisture absorption percentage at 60% relative humidity and that at 100% relative humidity.

6. A cooling apparatus comprising:

a radiator-type adsorber in which moisture contained in air in a flow path is adsorbed by a first adsorbent and a heat of adsorption generated by the adsorption of the moisture is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said radiator-type adsorber and said desorption cooler, to an outlet of air;

outlet switching means for switching the outlet of air from/to an inside of a room to/from an outside thereof; and heating means for heating said first adsorbent in said adsorber such that the moisture is desorbed from said first adsorbent;

wherein said first adsorbent has a 10% or more difference between its moisture absorption percentage at 0% relative humidity and that at 50% relative humidity; and said second adsorbent has a 10% or more difference between its moisture absorption percentage at 60% relative humidity and that at 100% relative humidity.

7. A plurality of cooling apparatuses combined to form a cooling system, and each one of the cooling apparatuses comprising:

an adsorber in which moisture contained in air in a flow path is adsorbed by a first adsorbent;

a radiator in which heat of the air in the flow path is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said adsorber, said radiator and said desorption cooler, to an outlet of air;

outlet switching means for switching the outlet of air from/to an inside of a room to/from an outside thereof;

heating means for heating said first adsorbent in said adsorber such that the moisture is desorbed from said first adsorbent;

wherein each of said plurality of cooling apparatuses is operated in two operational modes; one of the two operational modes being a cooling mode in which the outlet of air is switched to the inside of the room by means of said outlet switching means and said blast means is activated while said heating means is not activated; the other being a reproducing mode in which the outlet of air is switched to the outside of the room by means of said outlet switching means and said heating means as well as said blast means are activated; and said two operational modes are alternately repeated by each of said plurality of cooling apparatuses, while control is made in such a manner that at least one of said plurality of cooling apparatuses is operated in said cooling mode.

8. A plurality of cooling apparatuses combined to form a cooling system, and each one of the cooling apparatuses comprising a radiator-type adsorber in which moisture contained in air in a flow path is adsorbed by a first adsorbent and a heat of adsorption generated by the adsorption of the moisture is radiated out of the flow path via a heat conductive member;

a radiator in which heat of the air in the flow path is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said radiator-type adsorber, said radiator and said desorption cooler, to an outlet of air;

outlet switching means for switching the outlet of air from/to an inside of a room to/from an outside thereof; and heating means for heating said first adsorbent in said adsorber such that the moisture is desorbed from said first adsorbent;

wherein each of said plurality of cooling apparatuses is operated in two operational modes; one of the two operational modes being a cooling mode in which the outlet of air is switched to the inside of the room by means of said outlet switching means and said blast means is activated while said heating means is not activated; the other being a reproducing mode in which the outlet of air is switched to the outside of the room by means of said outlet switching means and said heating means as well as said blast means are activated; and said two operational modes are alternately repeated by each of said plurality of cooling apparatuses, while control is made in such a manner that at least one of said plurality of cooling apparatuses is operated in said cooling mode.

9. A plurality of cooling apparatuses combined to form a cooling system, and each one of the cooling apparatuses comprising a radiator-type adsorber in which moisture contained in air in a flow path is adsorbed by a first adsorbent and a heat of adsorption generated by the adsorption of the moisture is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said radiator-type adsorber and said desorption cooler, to an outlet of air;

outlet switching means for switching the outlet of air from/to an inside of a room to/from an outside thereof; and heating means for heating said first adsorbent in said adsorber such that the moisture is desorbed from said first adsorbent;

wherein each of said plurality of cooling apparatuses is operated in two operational modes; one of the two operational modes being a cooling mode in which the outlet of air is switched to the inside of the room by means of said outlet switching means and said blast means is activated while said heating means is not activated; the other being a reproducing mode in which the outlet of air is switched to the outside of the room by means of said outlet switching means and said heating means as well as said blast means are activated; and said two operational modes are alternately repeated by each of said plurality of cooling apparatuses, while control is made in such a manner that at least one of said plurality of cooling apparatuses is operated in said cooling mode.

10. A cooling apparatus comprising:

an adsorber in which moisture contained in air in a flow path is adsorbed by a first adsorbent;

a radiator in which heat of the air in the flow path is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said adsorber, said radiator and said desorption cooler, to an outlet of air;

outlet switching means for switching the outlet of air from/to an inside of a room to/from an outside thereof; and heating means for heating said first adsorbent in said adsorber such that the moisture is desorbed from said first adsorbent;

further comprising at least one auxiliary cooling mechanism having:

flow diverting means for diverting part of the air flowing through a main course of the flow path to a side course thereof;

an auxiliary desorption cooler in which moisture is desorbed from the second adsorbent into the air flowing through the side course of the flow path, thereby cooling the air in the side course of the flow path;

a heat exchanger by which heat exchange is allowed between the air in the main course of the flow path and the air in the side course thereof, which has been cooled by said auxiliary desorption cooler, thereby cooling the air in the main course of the flow path, said at least one auxiliary cooling mechanism being disposed in an upper course of the flow path relative to said desorption cooler such that the air cooled by passing through the main course of the flow path in said at least one auxiliary cooling mechanism is subsequently flowed into said desorption cooler;

said first adsorbent has a 10% or more difference between its moisture absorption percentage at 0% relative humidity and that at 50% relative humidity; and said second adsorbent has a 10% or more difference between its moisture absorption percentage at 60% relative humidity and that at 100% relative humidity.

11. A cooling apparatus comprising:

a radiator-type adsorber in which moisture contained in air in a flow path is adsorbed by a first adsorbent and a heat of adsorption generated by the adsorption of the moisture is radiated out of the flow path via a heat conductive member;

a radiator in which heat of the air in the flow path is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said radiator-type adsorber, said radiator and said desorption cooler, to an outlet of air;

outlet switching means for switching the outlet of air from/to an inside of a room to/from an outside thereof;

heating means for heating said first adsorbent in said adsorber such that the moisture is desorbed from said first adsorbent;

further comprising at least one auxiliary cooling mechanism having:

flow diverting means for diverting part of the air flowing through a main course of the flow path to a side course thereof;

an auxiliary desorption cooler in which moisture is desorbed from the second adsorbent into the air flowing through the side course of the flow path, thereby cooling the air in the side course of the flow path;

a heat exchanger by which heat exchange is allowed between the air in the main course of the flow path and the air in the side course thereof, which has been cooled by said auxiliary desorption cooler, thereby cooling the air in the main course of the flow path, said at least one auxiliary cooling mechanism being disposed in an upper course of the flow path relative to said desorption cooler such that the air cooled by passing through the main course of the flow path in said at least one auxiliary cooling mechanism is subsequently flowed into said desorption cooler;

said first adsorbent has a 10% or more difference between its moisture absorption percentage at 0% relative humidity and that at 50% relative humidity; and said second adsorbent has a 10% or more difference between its moisture absorption percentage at 60% relative humidity and that at 100% relative humidity.

12. A cooling apparatus comprising:

a radiator-type adsorber in which moisture contained in air in a flow path is adsorbed by a first adsorbent and a heat of adsorption generated by the adsorption of the moisture is radiated out of the flow path via a heat conductive member;

a desorption cooler in which moisture is desorbed from a second adsorbent into the air in the flow path, thereby cooling the air in the flow path;

blast means for flowing the air through the flow path, said flow path running from an inlet of air, via said radiator-type adsorber and said desorption cooler, to an outlet of air;

outlet switching means for switching the outlet of air from/to an inside of a room to/from an outside thereof;

heating means for heating said first adsorbent in said adsorber such that the moisture is desorbed from said first adsorbent;

further comprising at least one auxiliary cooling mechanism having:

flow diverting means for diverting part of the air flowing through a main course of the flow path to a side course thereof;

an auxiliary desorption cooler in which moisture is desorbed from the second adsorbent into the air flowing through the side course of the flow path, thereby cooling the air in the side course of the flow path;

a heat exchanger by which heat exchange is allowed between the air in the main course of the flow path and the air in the side course thereof, which has been cooled by said auxiliary desorption cooler, thereby cooling the air in the main course of the flow path, said at least one auxiliary cooling mechanism being disposed in an upper course of the flow path relative to said desorption cooler such that the air cooled by passing through the main course of the flow path in said at least one auxiliary cooling mechanism is subsequently flowed into said desorption cooler;

said first adsorbent has a 10% or more difference between its moisture absorption percentage at 0% relative humidity and that at 50% relative humidity; and said second adsorbent has a 10% or more difference between its moisture absorption percentage at 60% relative humidity and that at 100% relative humidity.

* * * * *